Aug. 7, 1934.   J. MADER   1,969,023
AGRICULTURAL IMPLEMENT
Filed Feb. 8, 1934

WITNESS
F. J. Hartman

INVENTOR
Joseph Mader,
BY George K. Helbert
ATTORNEY

Patented Aug. 7, 1934

1,969,023

UNITED STATES PATENT OFFICE 1,969,023

AGRICULTURAL IMPLEMENT

Joseph Mader, Philadelphia, Pa., assignor to S. L. Allen & Co., Inc., Philadelphia, Pa., a corporation of Pennsylvania Application February 8, 1934, Serial No. 710,283

11 Claims. (Cl. 97—48)

My invention relates to agricultural implements of the type which comprises a traction element and a tool-supporting or like frame detachably coupled thereto and drawn thereby, and is concerned with the provision of improved means for effecting this detachable coupling. While particularly applicable under conditions in which the traction element is of the two-wheel or unstable type and thus partially dependent for support under operating conditions upon the frame which it is designed to draw, the use of the invention is not confined to implements of that particular sort as it may be employed with advantage under other circumstances in which a detachable connection between two elements is required.

The principal object of the invention, therefore, is the provision of novel means for detachably connecting a tool carrying frame or the like to a traction element such as a two-wheeled garden tractor in such manner that the connection will be securely maintained under normal operative conditions though allowing the parts to be readily separated when desired upon being brought into predetermined relationship with each other.

A further object of the invention is the provision of connecting means of the character aforesaid which are effective to allow a limited amount of vertical movement or play between the tool carrying frame and the traction element to enable the implement as a whole to accommodate itself to irregularities in the ground as it is moved thereover; which are of extremely simple design and construction; which permit the tool carrying frame to be coupled to and detached from the traction element with a minimum of exertion and difficulty; which enable these operations to be readily performed under normal conditions by a single individual without assistance; which can be manufactured cheaply; which are not liable to become damaged or get out of order under any usual conditions of service; and which may be employed for detachably connecting almost any type of tool supporting frame or the like to a traction element or other machine intended for drawing it over the surface of the ground.

Other objects, advantages and novel features of design, construction and arrangement comprehended by the invention are hereafter more particularly pointed out or will be apparent to those skilled in the art from the following description of a preferred embodiment thereof adapted for detachably coupling a tool carrying frame and a two-wheeled garden tractor as illustrated in the accompanying drawing in which.

Figure 2:
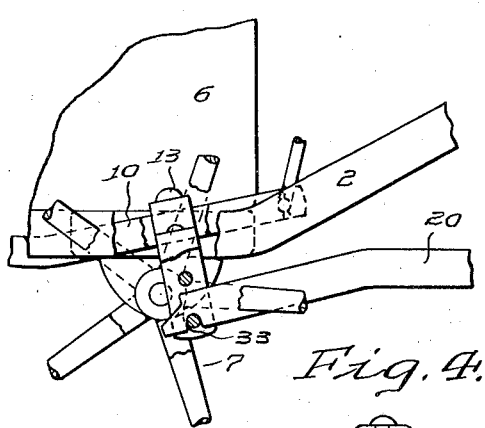
Fig. 2 is a considerably enlarged fragmentary view, principally in side elevation, of certain of the parts shown in Fig. 1 in the same position as in said figure.
Figure 3:
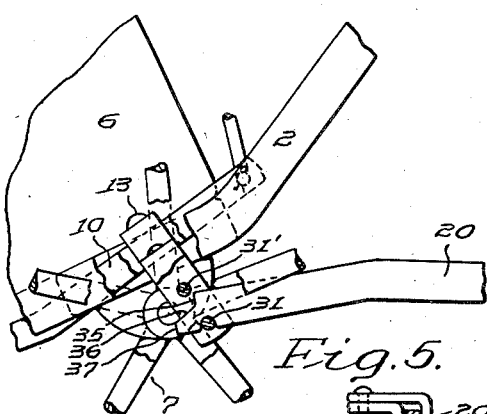
Figure 4:
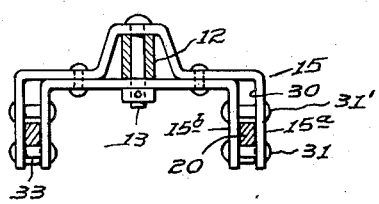
Figure 5:
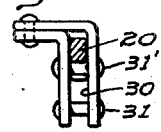

Fig. 3 is a view similar to Fig. 2 but showing the tractor swung upward and forward from normal operating position preparatory to detachment of the tool frame, and Figs. 4 and 5 are respectively detail views of a portion of the tractor with the tool frame bars, connected thereto in shown in vertical section, connected thereto in different positions. Throughout the drawing, the same characters are used to designate corresponding parts.

Figure 1:
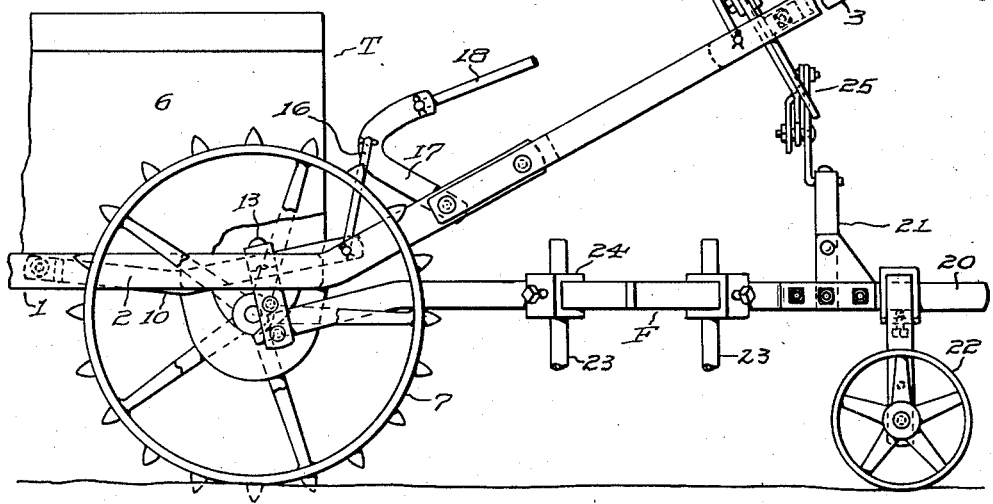
Fig. 1 is a fragmentary side elevation of the tractor and frame operatively connected through the medium of the invention, many parts unnecessary to a proper comprehension of the invention being either broken away or removed entirely.

The implement shown in Fig. 1 may be regarded as comprising the tractor T and the tool carrying frame F operatively united through the medium of the present invention but as the specific construction of the tractor and likewise of the frame form no part thereof save in the particulars directly concerned therewith, a general description of them will suffice. Thus as shown, the tractor comprises the usual frame 1 having laterally spaced side members 2 bent angularly upward at their rear ends and supporting steering handles 3 terminating in vertically oscillatory grips 5, a motor 6, mounted on the frame, serving through any suitable mechanism to drive wheels 7, respectively mounted on transversely extending axles. The tractor is thus of the unstable type requiring some operative support from the tool carrying frame or other element it is designed to draw when operatively attached thereto with the frame extending generally rearwardly from the vicinity of the axles and beneath the steering handles; means are therefore provided to which the forward end of the tool frame may be connected and other means for affording, among other things, vertical support to the handles from the tool frame. As shown, the first of these said means comprises a pair of laterally spaced bars 10 respectively pivoted at their front ends to the tractor frame members 2 and, adjacent their rear ends, provided with a transversely extending member which is bent to form an eye 12 for the passage of a king bolt 13 (see Fig. 4) which is extended through an inverted generally U-shaped yoke 15 so as to pivotally support the latter on the eye. To facilitate adjustment of the height of the front end of the tool frame when so connected the end of one of the bars 10 is attached by a link 16 to a lever 17 pivoted to the tractor frame and positioned by a rod 18 extending to an adjusting lever (not shown) located near one of the steering grips so that the bars 10 and yoke can be raised or lowered for a limited distance.

The tool carrying frame F may comprise a pair of laterally spaced frame bars 20 connected by transversely extending cross members, only one of which, designated as 21, is shown; these bars are vertically supported adjacent their rear ends upon wheels 22 and in the usual way carry ground working tools 23 adjustably secured to the bars by clips 24, only two of these tools being illustrated though in practice a greater number is generally employed. To afford the requisite vertical suppport to the rear part of the tractor, suitable means are interposed between the frame F and the tractor handles, which said means may be of any character adapted for the performance of their intended function; in the particular assembly shown they are generally designated as 25 and extend from the transverse arch 21, to which they are detachably connected, to the tractor handles and steering grips in such manner that by oscillating the grips, a relative lateral swinging movement about the king bolt 13 may be imparted to the tractor and the tool carrying frame to enable the operator to cause the ground working tools to properly follow the plant rows. From the foregoing description it therefore will be apparent the tractor and tool frame are of well known construction and when coupled together, preferably by means of the present invention as now to be described, form an operative unit adapted for the cultivation of the ground.

As hitherto mentioned, the tractor is provided with a downwardly depending yoke 15. This yoke preferably comprises an outer part 15a and an inner complementary part 15b whose arms are inwardly spaced from the corresponding arms of the outer part so as to form slots 30 at each side of the yoke of a width adapted to receive the front ends of the tool frame bars 20. The two parts of the yoke are riveted or welded together to form a unitary assembly, and, preferably, two studs 31, 31' are extended in vertically spaced relation through each slot with their axes substantially horizontal. Conveniently, as shown, these studs may be in the form of rivets headed over against the outer faces of the yoke arms, those portions of the studs between the latter being adapted to selectively engage notches provided in the ends of the tool frame bars.

These notches, designated as 33, are formed as best shown in Figs. 2 and 3, in the lower edge of each frame bar near its forward end and are of size and contour to receive the studs, while in depth they preferably approximate the full diameter of the latter, so that when engagement is effected the bar will depend on each side of the stud a considerable distance below its axis. Furthermore, the studs at each side of the yoke are so positioned that the distance between them and between the upper stud and superjacent part of the yoke is a little less than the depth of the frame bar so that when the latter is hooked over the lower stud, the clearance between the upper edge of the bar and the upper stud is less than the diameter of the lower stud, and when it is hooked over the upper stud the clearance between it and the superjacent part of the yoke is less than the diameter of the upper stud, the upper stud or the yoke, as the case may be, thus forming an abutment or stop, so that it is impossible so long as the yoke and the bar extend substantially normal to each other, as when the tractor and the frame are operatively assembled, for the frame bar to be lifted off the stud with which it is engaged, as could, of course, be done if the said clearances exceeded the full depth of the bar. Since in the particular tractor illustrated the yoke 15 is inclined somewhat upwardly and rearwardly, it is desirable to correspondingly forwardly and downwardly incline the front ends of the frame bars so that they will substantially form a right angle with the yoke when assembled therewith; if the latter is disposed vertically, however, this forward and downward inclination of the frame bars is ordinarily omitted as the parts then occupy a like right angled relation when assembled.

In order to allow the ends of the bars to be hooked over studs 31 or 31' the upper front corner of each bar is removed, preferably by cutting the bar downwardly from its upper edge substantially in alignment with the front edge of the subjacent notch to form a shoulder 35 at right angles to the bar edge, then cutting it angularly forward to form an inclined face 36 and, finally, again cutting it downwardly to its lower edge to form a blunt end face 37, the inclined face 36 desirably extending at an angle of aproximately 45° to the edge of the bar between the bottom of the shoulder 35 and the end face 37. If, preferred, however, the end of the bar instead of being formed as just described, may merely be beveled at an angle of about 45° provided the point of intersection of the beveled face and the upper edge of the bar is coincident with or a little in front of the center of the subjacent notch.

It will thus be apparent that when the yoke and adjacent parts of the tool frame bars are substantially at right angles to each other, it is impossible to insert the ends of the bars between the studs 31, 31' or between stud 31' and the yoke, for the distances between the studs or upper stud and yoke, as the case may be, is less than the depth of the bars, but if the angle between the yoke and adjacent portions of the bars be suitably increased, the extremities of the bars defined by the inclined faces can be pushed between the studs sufficiently to allow the notches 33 to be engaged over either stud after which, if the yoke be permitted to assume its substantially normal relation to the adjacent portions of the bars, it is impossible to disengage the parts until the angle between them is again sufficiently increased.

Assuming, therefore, that it be desired to couple the tractor and tool carrying frame together, the latter being supported by the wheels 22 and tools 23 with the major portion of its frame bars extending horizontally, the tractor is first pulled back toward the frame with slots 30 in the yoke aligned with the frame bars until the extremities of the latter enter the slots between the studs 31, 31' or between studs 31' and the upper part of the yoke. Thereupon, the tractor handles are swung forward and upward so as to increase the angle between the yoke and the bars and at the same time carry the studs back along the lower edges of the latter, the tractor being meanwhile pulled slightly back if necessary until the studs are aligned with the notches 33 in the bars which then drop into place over the studs. The tractor handles are then allowed to return to normal position, thereby bringing the yoke to a substantially right angled relation with the adjacent portions of the frame bars and locking the ends of the latter over the studs, from which position they cannot be removed until the tractor handles are again swung upward and forward for a sufficient distance. The requisite connection, if any, between the rear part of the tool carrying frame and the tractor handles thru the medium of the connecting means 25 may now be made, thus placing the implement as a whole in condition for use. In Fig. 4 I have shown the bars engaged with the lower stud 31 and in Fig. 5 as engaged with the upper stud 31' and thus in a relatively higher position with respect to the yoke.

It will be noted that the connection between the frame bars and the yoke is by no means a rigid one since the bars can oscillate thru a limited arc about the studs without becoming detached therefrom although prevented, under normal conditions of use, from jumping off the studs and thus breaking the connection. Moreover, after a very little practice, it becomes an extremely easy matter to engage and disengage the bars from the studs by merely manipulating the tractor handles substantially in the manner heretofore described so that the necessity of reaching beneath the tractor to couple the parts together is avoided, while the services of a helper, which are sometimes required with certain of the coupling mechanisms heretofore utilized, are likewise obviated, the requisite engagement and disengagement of the parts being readily performed by one person from a standing position.

By utilizing a pair of studs at each side of the yoke and positioning them with respect to each other and to the overlying portion of the yoke as hereinbefore described, either of the studs is adapted to receive the notch in the adjacent frame bar, thus affording a limited capacity for adjusting the height of the latter with respect to the yoke and, in turn, to the tractor as a whole. If a greater range of adjustment be required, a greater number of studs, properly positioned with respect to each other, may of course be provided, or if a single position of the bars will suffice but one stud 31' at a proper distance from the superjacent part of the yoke is all that is necessary. Moreover, the particular conformation of the ends of the frame bars is capable of considerable variation as long as it is such as to facilitate entry of the bars into the slots at the initiation of the coupling operation and to allow the studs to be then engaged in the notches without, on the other hand, increasing the clearance between the upper surface of the bars and the superjacent stud or yoke sufficiently to allow the notches to be cleared from the studs with which they are engaged after the yoke is returned to normal operative position.

While I have herein described a preferred embodiment of my invention with considerable particularity and have shown it in association with a tractor and tool carrying frame of well known type, I do not thereby desire or intend to specifically restrict myself to any precise details of construction or arrangement of parts in the carrying out of the invention nor to its use with any particular kind or style of agricultural implement.

Having thus described my invention, I claim and desire to protect by Letters Patent of the United States:

1. An agricultural implement comprising a tractor, a tool supporting element and means for detachably coupling them together including a member carried by the tractor providing a slot, a stud extending transversely of the slot, a bar extending forwardly from the tool supporting element and having a notch engageable over the stud when said bar and member are in predetermined angular relation to thereby couple the elements together, and means for subsequently maintaining said engagement after the bar and member have been brought into a different angular relation to each other.

2. An agricultural implement comprising a tractor, a tool supporting element, and means for detachably coupling them together including a member carried by the tractor providing a slot, a stud extending transversely of said slot, a bar extending forwardly from the tool supporting element having a notch engageable over the stud when the member is moved from its normal position into a predetermined angular relation with the bar, and means for maintaining said engagement after the member is returned to normal position.

3. An agricultural implement comprising a tractor, a tool supporting element, and means for detachably coupling them together including a downwardly depending member carried by the tractor providing a slot, a stud extending transversely of the slot, a bar projecting forwardly from the element having a notch in its lower edge engageable over the stud when the member is turned to a predetermined angle with respect to the bar, and means for thereafter maintaining said engagement while the member occupies a position of lesser angularity to the bar.

4. An agricultural implement comprising a tractor, a tool supporting element, and means for detachably coupling them together including a member carried by the tractor providing a slot, a stud extending transversely of the slot, an abutment spaced above the stud, a bar projecting forwardly from the element having a notch in its lower edge adjacent its extremity and cut away adjacent its upper front corner to thereby enable the end of the bar to be entered between the stud and the abutment and the notch to be engaged over the stud when the member occupies a predetermined angular relation with respect to the bar, said abutment being adapted to extend over the bar in rear of said cut-away portion when the member is thereafter returned to a position of less angularity to the bar to thereby prevent disengagement of the latter from the stud.

5. In an agricultural implement comprising a tractor and a tool supporting frame, means for detachably coupling the frame to the tractor including a member carried by the tractor providing a slot, a stud extending transversely in the slot, an abutment spaced above the stud, a bar of greater normal depth than the distance between the stud and the abutment projecting forward from the frame and having its front upper corner cut away and a notch in its lower edge whereby when the member is turned from normal position to a predetermined angular relation to the bar, the end of the latter may be inserted between the stud and the abutment and the notch engaged over the stud, the abutment serving to limit the movement of the bar with respect to the stud to an amount insufficient to allow disengagement of the notch from the stud when the member is thereafter returned to its normal operative position.

6. In an agricultural implement comprising a tractor and a tool carrying frame, means for detachably coupling said tractor and frame together including a member carried by the tractor providing a slot, a pair of studs extending transversely through the slot in spaced relation, a bar projecting forwardly from the frame having its upper front corner beveled and a notch in its lower edge, the normal depth of the bar being greater than the distance between said studs, whereby when the member is turned to predetermined angular relation to the bar the beveled end of the latter can be inserted between the studs and the notch engaged over the lowermost thereof and, when the member is thereafter turned to lesser angular relation with the bar, the other stud is effective to limit movement of the bar with respect to the first stud to an amount insufficient to enable disengagement of the notch therefrom.

7. In combination with a traction element and a tool supporting element, means for detachably coupling said elements together comprising a horizontally extending stud and an abutment disposed at a predetermined distance therefrom on one element, a bar extending from the other element having a notch in its lower edge and cut away adjacent its end to enable insertion thereof between the stud and the abutment when the elements are in predetermined angular relation whereby the notch may be then hooked over the stud, the abutment serving when the elements are in a different angular relation to limit movement of the bar with respect to the stud to an amount insufficient to permit its disengagement therefrom.

8. In combination with a traction element and a tool supporting element, means for detachably coupling said elements together comprising a bar carried by one element having a notch in its lower edge adjacent its front end and cut away adjacent its front upper corner, a horizontally extending stud carried by the other element of less diameter than the depth of the notch and an abutment disposed above the stud at a distance therefrom less than the depth of the uncut-away portion of the bar whereby the notch in the latter may be engaged over the stud when the stud-carrying element is in one position with respect to the bar and when the said element is thereafter moved to a position in which the abutment overlies said uncut-away portion movement of the bar with respect to the stud is limited to an amount less than the diameter of the stud.

9. In combination with a tractor and a tool supporting frame, means for detachably coupling the frame to the tractor comprising a member carried by the tractor, a horizontal stud adjacent thereto and an abutment above the stud, a bar projecting from the frame having a notch in its lower edge adapted to receive the stud and its upper front corner cut away, whereby the notch may be hooked over the stud when the member is turned to such position with respect to the bar that the abutment is adjacent said cut-away portion thereof, the abutment serving to limit movement of the bar with respect to the stud after said engagement is effected and the element returned to a position in which the abutment overlies the non-cut-away portion of the bar.

10. In combination with a tractor and a tool supporting frame, means for detachably coupling the frame to the tractor comprising a member carried by the tractor, a horizontal stud adjacent thereto and an abutment above the stud, a bar projecting from the frame having a notch in its lower edge adapted to receive the stud and its upper front corner cut away, whereby the notch may be hooked over the stud when the member is turned to such position with respect to the bar that the abutment is adjacent said cut-away portion thereof, the abutment serving to limit movement of the bar with respect to the stud after said engagement is effected and the element returned to a position in which the abutment overlies the non-cut-away portion of the bar, and means for limiting movement of the bar axially of the stud after it is engaged therewith.

11. The combination with traction and tool supporting elements, of means for detachably coupling them together comprising a member carried by one element and a stud supported thereon, a bar extending from the other element having a notch engageable over the stud when the bar and the member are in predetermined angular relation, and means for thereafter maintaining said engagement while the member and the bar are at a lesser angle to each other.

JOSEPH MADER.